United States Patent
Ahn et al.

(10) Patent No.: US 8,364,672 B2
(45) Date of Patent: Jan. 29, 2013

(54) CONCEPT DISAMBIGUATION VIA SEARCH ENGINE SEARCH RESULTS

(75) Inventors: David Ahn, San Francisco, CA (US); Michael Paul Bieniosek, Woodinville, WA (US); Andrei Peter Makhanov, San Jose, CA (US); Franco Salvetti, San Francisco, CA (US); Giovanni Lorenzo Thione, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 44 days.

(21) Appl. No.: 12/953,139

(22) Filed: Nov. 23, 2010

(65) Prior Publication Data

US 2012/0130972 A1    May 24, 2012

(51) Int. Cl.
*G06F 7/00* (2006.01)
*G06F 17/30* (2006.01)
(52) U.S. Cl. ........................ 707/728; 707/706
(58) Field of Classification Search .................. 707/737, 707/706, 728
See application file for complete search history.

(56) References Cited

U.S. PATENT DOCUMENTS

| | | | |
|---|---|---|---|
| 7,225,184 B2 | 5/2007 | Carrasco | |
| 7,260,571 B2 | 8/2007 | Amitay | |
| 7,548,910 B1 | 6/2009 | Chu | |
| 7,827,170 B1 | 11/2010 | Horling et al. | |
| 7,860,852 B2* | 12/2010 | Brunner et al. | 707/706 |
| 8,122,016 B1* | 2/2012 | Lamba et al. | 707/723 |
| 2002/0120609 A1 | 8/2002 | Lang | |
| 2005/0283468 A1 | 12/2005 | Kamvar | |
| 2006/0224580 A1* | 10/2006 | Quiroga et al. | 707/5 |
| 2007/0118803 A1* | 5/2007 | Walker et al. | 715/744 |
| 2008/0033982 A1 | 2/2008 | Parikh et al. | |
| 2008/0120276 A1 | 5/2008 | Chennavasin | |
| 2008/0133505 A1 | 6/2008 | Bayley | |
| 2008/0263038 A1 | 10/2008 | Judge et al. | |
| 2009/0222421 A1* | 9/2009 | Aoki et al. | 707/3 |
| 2009/0259459 A1* | 10/2009 | Ceusters et al. | 704/9 |
| 2010/0031190 A1 | 2/2010 | Hall et al. | |
| 2010/0049708 A1* | 2/2010 | Kawai et al. | 707/5 |
| 2010/0169316 A1 | 7/2010 | Gehlot | |
| 2012/0089598 A1 | 4/2012 | Oztekin et al. | |

OTHER PUBLICATIONS

Valle-Agudo, David Del, UC3M_13: Disambiguation of Person Names Based on the Composition of Simple Bags of Typed Terms—Published Date: 2007 http://www.aclweb.org/anthology/S/S07/S07-1079.pdf.

Martins, Bruno, et al., Handling Locations in Search Engine Queries—Published Date: 2006 http://citeseerx.ist.psu.edu/viewdoc/download?doi=10.1.1.99.1073&rep=rep1&type=pdf.

Bollegala, Danushka, et al., Extracting Key Phrases to Disambiguate Personal Name Queries in Web Search—Published Date: 2006 http://www.iba.t.u-tokyo.ac.jp/~danushka/papers/CLLIR.pdf.

(Continued)

*Primary Examiner* — Cam Truong
(74) *Attorney, Agent, or Firm* — Shook, Hardy & Bacon LLP

(57) ABSTRACT

Concept disambiguation is provided for search queries by analyzing search results in conjunction with an ontology of concepts. An ontology of concepts is identified, and at least one document is associated with each concept. The document associated with a concept is representative of the concept and used to generate a concept signature. When a search query is received, it is processed to obtain search results. The search results are used to generate a search results signature, which is compared to the concept signatures to identify one or more concepts that are relevant to the search query.

8 Claims, 7 Drawing Sheets

OTHER PUBLICATIONS

Wan, Xiaojun, et al., Person Resolution in Person Search Results: WebHawk—Published Date: 2005 http://research.microsoft.com/en-us/um/people/jfgao/paper/cf440-wan.pdf.

P., Deepak, et al., Context Disambiguation in Web Search Results—Published Date: 2003 http://citeseerx.ist.psu.edu/viewdoc/download?doi=10.1.1.105.4767&rep=rep&type=pdf.

Sieg, Ahu, et al., Using Concept Hierarchies to Enhance User Queries in Web-based Information Retrieval—Published Date: 2004 http://citeseer.xist.psu.edu/viewdoc/download?doi=10.1.1.904140&rep=rep1&type=pdf.

Bonino, Dario, et al., Ontology Driven Semantic Search—Published Date: 2004 http://www.wseas.us/e-library/conferences/venice2004/papers/472-334.pdf.

Hollink, Vera, et al., Semantic vs term-based query modification analysis—Published Date: 2010 http://homepages.cwi.nl/~media/publications/Hollink10DIR.pdf.

Gauch, Susan, et al., User Profiles for Personalized Information Access—Published Date: 2007 http://citeseer.uark.edu/publications1/user%20profiles.pdf.

Trajkova, Joana, et al., Improving Ontology-Based User Profiles—Published Date: 2004 http://citeseer.uark.edu/publications/RIAO2004.pdf.

Non-Final Office Action from U.S. Appl. No. 12/953,166 mailed Apr. 24, 2012.

* cited by examiner

CONCEPT DISAMBIGUATION VIA SEARCH ENGINE SEARCH RESULTS

CROSS-REFERENCE TO RELATED APPLICATIONS

This application is related by subject matter to the invention disclosed in the following commonly assigned application filed on even date herewith: U.S. application Ser. No. 12/953,166, entitled "IDENTIFYING REFERRING EXPRESSIONS FOR CONCEPTS." The aforementioned application is herein incorporated by reference in its entirety.

BACKGROUND

The amount of information and content available on the Internet continues to grow exponentially. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the most popular service on the Internet today.

Many search queries are directed to particular entities or concepts, such as a particular person, place, or thing. When some search engines receive a search query from an end user, the search engines attempt to identify whether the search query refers to a particular concept. If so, the search engine may configure that search results returned to the end user based on the identified concept. However, some search queries may be ambiguous about which concept is intended. For instance, if a user submits the search query "kennedy birthday," it would be ambiguous which kennedy the user intends. As another example, if a user submits the search query "java," it's unclear whether the user intends the island, coffee, or the programming language.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to employing search results from a search engine to disambiguate the concepts to which a search query may refer. In accordance with embodiments, an ontology of concepts may be generated, and at least one document may be identified for each concept that is representative of that concept. The document associated with a concept may be used to generate a concept signature for the document. The concept signatures may be employed in conjunction with search results to disambiguate the concepts to which a search query may refer. In particular, a search query may be processed by a search engine to obtain search results, and a search results signature may be generated based on the search results. The search results signature may be compared to the concept signatures to identify one or more concepts that are relevant to the search query. A concept identified for a search query may be employed when generating a search results page to return to an end user in response to the search query.

BRIEF DESCRIPTION OF THE DRAWINGS

The present invention is described in detail below with reference to the attached drawing figures, wherein.

DETAILED DESCRIPTION

Figure 1:
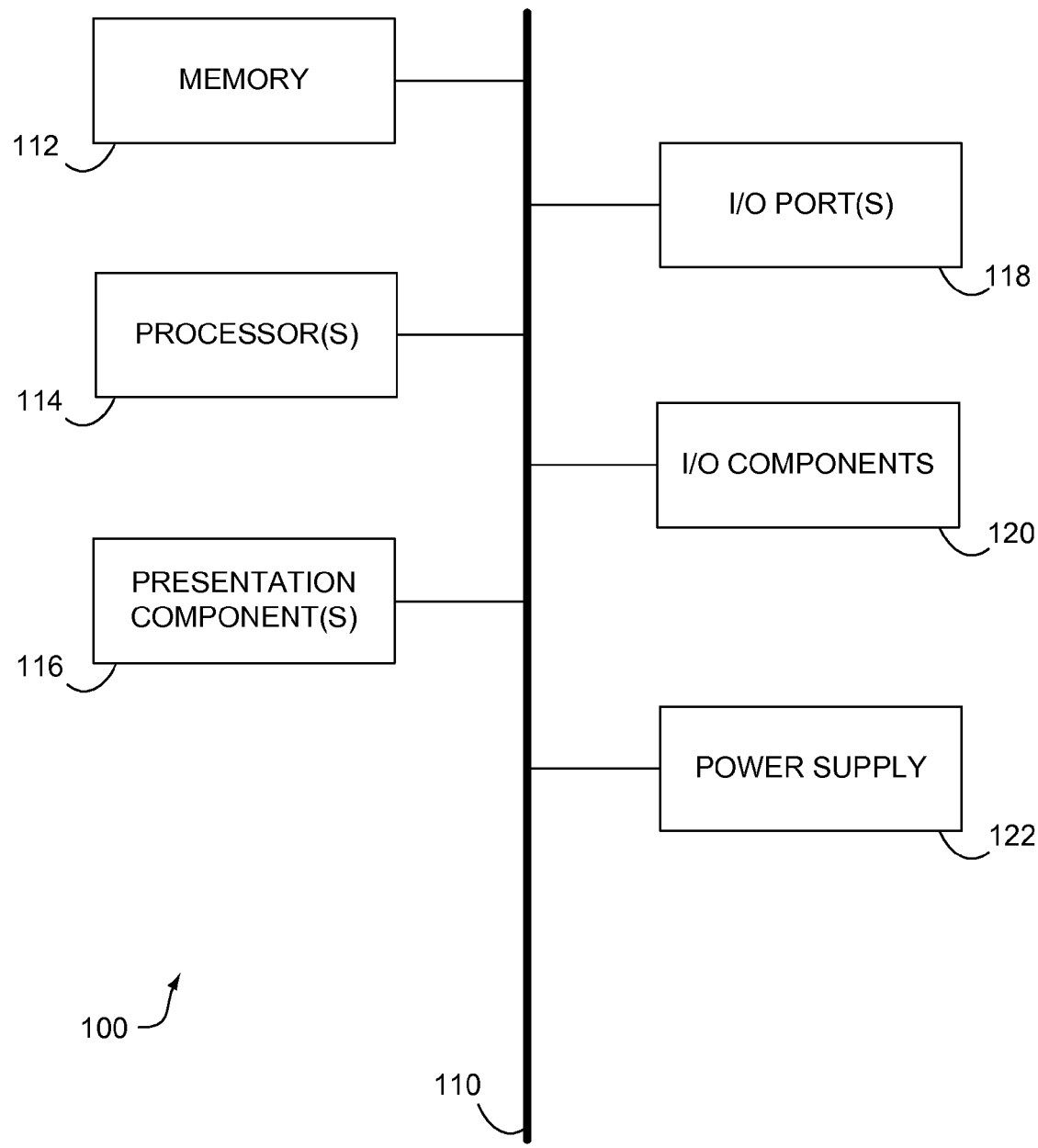
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to disambiguating the various concepts to which a search query may refer by analyzing the search results provided for the search query. As used herein, a "concept" refers to any unique entity or topic that may be subject of description in a document. For instance, a concept may include a person, place, thing, or event.

In accordance with embodiments of the present invention, an ontology of concepts is identified. The ontology of concepts may be manually generated by search personnel or automatically generated, for instance, from an existing collection of documents. At least one document is associated with each of the concepts. The document associated with a given concept is unique to and representative of the concept. A concept signature is generated for each concept based on the document associated with each concept. In some embodiments, the concept signature may simply indicate a document identifier for each document associated with the concept. In some embodiments, the concept signature may be derived as a function of the content of each document associated with the concept. In further embodiments, the concept signature may be generated as a function of the identifiers in conjunction with the content of the search result documents.

The concepts signatures for the ontology of concepts may be employed in conjunction with search results from search queries to disambiguate the concepts to which the search queries refer. A search query may processed by a search engine to identify a set of search results. The search results are employed to generate a search results signature for the search query. In some embodiments, the search results signature may include document identifiers (e.g., URLs) for documents identified by the search results. In some embodiments, the search results signature may be generated as a function of the content of the documents identified by the search results.

The search results signature is compared against the concept signatures to identify one or more concept signatures that are similar to the search results signatures. This provides an indication of one or more concepts that are relevant to the search query. In some cases, a concept determined for an end user's search query may be employed to prepare the search results page returned to the end user in response to the search query. For instance, the identified concept may be employed for generating an instant answer that is provided on the search results page with web document search results.

Accordingly, in one aspect, an embodiment of the present invention is directed to one or more computer storage media storing computer-useable instructions that, when used by a computing device, cause the computing device to perform a method. The method includes identifying a concept and a document associated with the concept, and generating a concept signature for the concept based on the document associated with the concept. The method also includes receiving a search query, identifying search results for the search query, and generating a search results signature based on the search results. The method further includes comparing the search results signature to the concept signature. The method still further includes identifying the concept as being relevant to the search query based on comparison of the search results signature to the concept signature.

In another embodiment, an aspect of the invention is directed to a method for providing a search results page in response to a search query. The method includes analyzing a corpus of documents to identify a plurality of concepts, each concept corresponding with a document within the corpus of documents. The method also includes generating a concept signature for each concept based on a document from the corpus of documents corresponding with each concept, and storing a concept signature with each concept. The method further includes receiving a search query from an end user, performing a search to identify search results for the search query, and generating a search results signature based on the search results. The method further includes comparing the search results signature with the concept signatures, and identifying a first concept as being relevant to the search query based on comparison of the search query signature with the concept signatures. The method still further includes generating a search results page based on the first concept, and providing the search results page for presentation to the end user in response to the search query.

A further embodiment of the present invention is directed to a system including at least one processor and at least one computer storage medium storing a plurality of components. The components include a concept signature component, search results component, a search results signature generation component, a signature comparison component, a concept selection component, and a user interface component. The concept signature component generates concept signatures for a plurality of concepts, the concept signature for each concept being generated based on a document identified as being representative of each concept. The search results component performs a search on a search index using a search query to retrieve a set of search results. The search results signature generation component generates a search results signature based on the set of search results. The signature comparison component compares the search result signature against the concept signatures. The concept selection component selects a first concept for the search query based on comparison of the search results signature against the concept signatures. The user interface component provides a search results page generated based on the first concept for presentation to an end user.

Having described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other storage medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
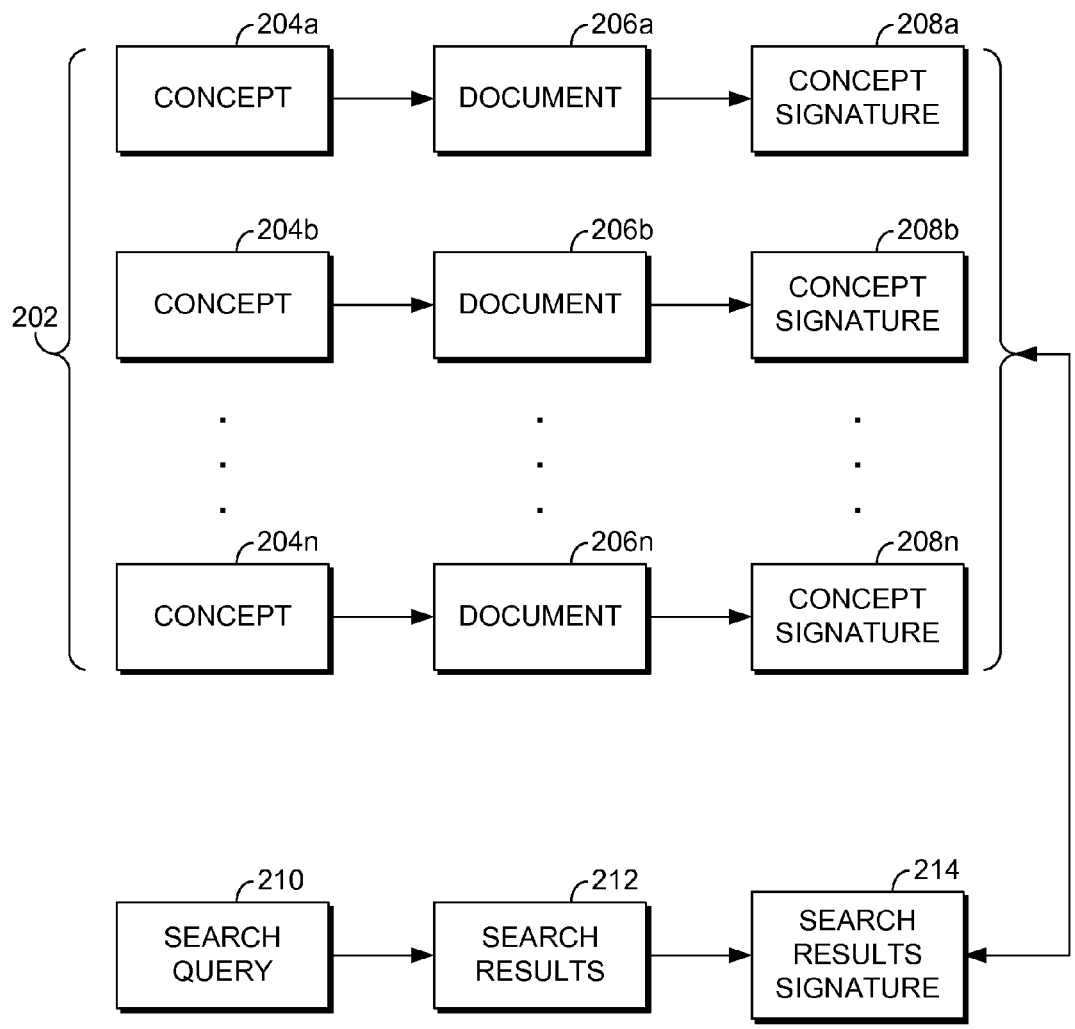
FIG. 2 is a diagram illustrating using search results for concept disambiguation purposes in accordance with an embodiment of the present invention.

Turning to FIG. 2, a diagram is provided that illustrates using search results for concept disambiguation purposes in accordance with an embodiment of the present invention. As shown in FIG. 2, an ontology 202 of concepts 204a-n is initially identified. Additionally, documents 206a-n are associated with the concepts 204a-n in the ontology 202. Although FIG. 2 illustrates only a single document with each concept, any number of documents may be associated with each concept. The document(s) associated with a given concept may be unique to that concept and representative of the concept. For instance, one concept in the ontology 202 may be Michael Jordan and a document providing a biography of Michael Jordan may be associated with that concept. In some embodiments, the documents may be electronic documents accessible via the web and indexed by a search engine. For instance, the document associated with the Michael Jordan concept may be the WIKIPEDIA web page discussing Michael Jordan.

Concept signatures 208a-n are generated for the concepts 204a-n in the ontology 202 as a function of the documents 206a-n. In one embodiment, the concept signatures 208a-n may simply comprise document identifiers (e.g., URLs) for the documents 206a-n. For instance, the concept signature 208a for the concept 204a may include the document identifier for the document 206a. In some embodiments, the concept signatures 208a-n may be generated as a function of the content of the document(s) 206a-n associated with each concept. Any number of different functions may be employed that provide an output that allows for estimating the similarity of signatures. By way of example only and not limitation, the concept signature 208a for the concept 204a may be generated by analyzing the textual content of the document 206a and creating a feature vector of terms and/or phrases found in the textual content. Any and all such variations are contemplated to be within the scope of embodiments of the present invention.

In various embodiments of the present invention, the concepts 204a-n in the ontology 202 and the associated documents 206a-n may be manually and/or automatically identified. For instance, in some embodiments, search system personnel may manually identify the concepts 204a-n for the ontology and may also manually identify and associate documents 206a-n with the concepts.

In some embodiments, the ontology 202 may be automatically generated based on an existing corpus of documents. By way of example only and not limitation, the ontology may be generated from documents in electronic encyclopedias (such as the WIKIPEDIA and BRITANICA encyclopedias), product shopping sites (such as the AMAZON product shopping site) or other databases, such as the IMDB and YELP databases. Each of these sources provide a collection of documents in which each document is directed to a particular concept (e.g., person, place, thing, etc.). Each document has a title and textual content discussing the concept to which the document pertains. In embodiments, the document titles may be taken as the concepts for the ontology 202 and the documents are associated with each corresponding concept and used for generating concept signatures for the concepts. While in some embodiments, the title of the documents from an existing collection of documents may be used to identify concepts, in other embodiments, the documents may be mapped (manually or automatically) to an already existing concept in an ontology.

Figure 3:
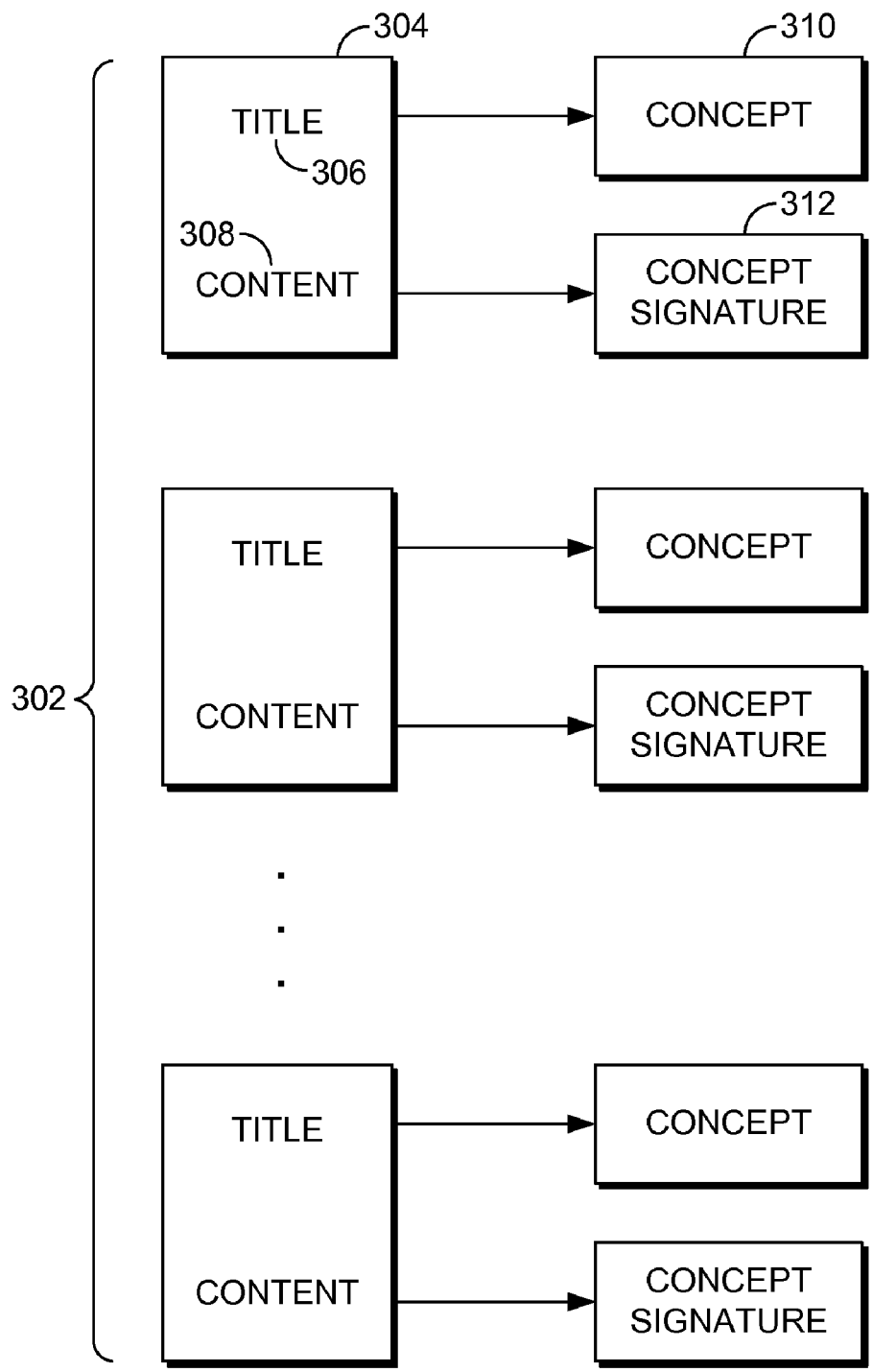
FIG. 3 is a diagram illustrating identifying concepts and generating concept signatures from an existing document corpus.

By way of illustration, FIG. 3 illustrates a corpus of documents 302 (e.g., documents retrieved from the WIKIPEDIA encyclopedia). Each document includes a title and textual content. A document 304 in the corpus of documents 302 may be processed by identifying the title 306 as a concept 310 and computing a concept signature 312 from the textual content 308 of the document 304. While FIG. 3 illustrates an embodiment in which the title 306 of the document 304 is used as the concept, in other embodiments, the document 304 may be mapped to an already existing concept in an ontology, and the textual content 308 may simply be used to generate the concept signature 312.

Although a single corpus of documents may be used to generate an ontology and/or associate documents with concepts, in other embodiments, multiple document corpuses may be employed. This may include mapping documents from two or more document corpuses to concepts in an ontology and using the documents from the various corpuses to represent the concepts. For example, an ontology of concepts could be created and/or documents identified by employing documents from both the WIKIPEDIA and BRITANICA encyclopedias. Linking may be employed to identify documents from different sources as being directed to the same concept in the ontology. Linking may be identified in a number of different manners. In some instances, hyperlinks may be included within documents in one source that link to documents in another source. In other instances, an external database may link documents from multiple sources to a given concept. For instance, the FREEBASE database identifies documents from various sources as being related to given topics. In further cases, linking between documents from different sources may be implicitly identified by analyzing information such as the title of the documents or the content of the documents. Any and all such variations are contemplated to be within the scope of embodiments of the present invention.

In some embodiments, such as those employing multiple document corpuses, a concept may have two or more documents associated with the concept. In some cases, a single concept signature may be generated as a function of the textual content of all the documents associated with the concept. In other cases, multiple concept signatures may be generated and associated with a single concept based on the multiple documents corresponding with that concept.

Returning to FIG. 2, the concept signatures 208a-n generated for concepts 204a-n in the ontology 202 may be employed in conjunction with search results 212 from a search query 210 for entity disambiguation purposes. As shown in FIG. 2, a search query 210 is processed by a search engine to identify a set of search results 212. The search results 212 are processed to generate a search results signature 214. The search results signature 214 may be generated using an approach similar to that used to generate the concept signatures 208a-n. For instance, in some embodiments, the search results signature 214 may simply include document identifiers of documents listed in the search results 212. In other embodiments, the search results signature 214 may be computed as a function of content of documents identified by the search results 212.

The search results signature 214 is compared to the concept signatures 208a-n to identify one or more concepts as being relevant for the search query. In embodiments in which signatures include document identifiers, the process may include identifying concept signatures having document identifiers matching document identifiers of the search results signature 214. In embodiments in which signatures are computed as a function of document content, the comparison may include computing a similarity measure between the search results signature 214 and at least some of the concept signatures 208a-n to determine the concept signatures having the greatest similarity to the search results signature 214. Based on the comparison of the search results signature 214 and concept signatures 208a-n, concept signatures may be ranked and one or more concepts can be selected as being the most relevant to the search query 210 based on the rank of their corresponding concept signatures.

In various embodiments of the present invention, concept disambiguation may be performed using any combination of offline or online processes. For instance, in some embodiments, various search queries may be processed offline to obtain search results and generate search results signatures. The search results signatures may be compared with concept signatures to allow for the identification of one or more concepts that are relevant to each search query processed offline. Information may be stored that maps the offline-processed search queries to the concepts identified for each. Accordingly, when a search query is submitted by an end user, the search engine may identify a stored search query corresponding with the user's search query and identify one or more concepts with the stored search query as being relevant to the user's search query.

In other embodiments, concept disambiguation may be performed online. In particular, when a user submits a search query, the search query is processed to obtain search results. A search results signature is generated from the search results and compared with concept signatures to identify one or more relevant concepts for the user's search query.

Identifying a concept for an end user's search query may facilitate providing a search results page in response to the query. For instance, in some embodiments, an "instant answer" may be provided on the search results page in addition to web document search results identified for the search query. In contrast to a web document search result, an instant answer may not be a web document crawled and indexed by the search engine. Instead, the instant answer may be information that is presented on the search engine results page relevant to the concept identified in the search query. By way of example only and not limitation, an instant answer may be a profile view that provides a summary or overview of important information regarding the concept. For instance, if the search query is directed to a particular person, the profile view may provide a summary of information regarding that person. As another example, an instant answer may be an answer to a specific question submitted as a search query. For instance, a user may submit the query "height of eiffel tower," and the instant answer would indicate the height.

Although in some embodiments a single concept may be selected as being relevant to a search query and used to generate a search results page, in other embodiments, it may be preferable to select multiple relevant concepts. For instance, multiple concepts may be selected to generate a disambiguation page that lists the multiple concepts and may be provided to the end user to allow the end user to select the concept. The disambiguation page may include search results for the search query, or the disambiguation page may simply indicate the concepts and search results may be provided after the end user selects a concept. In further embodiments, the system may keep history information about what past users have selected to disambiguate concepts and may use that information to determine how to select concepts for newer users.

In some embodiments, multiple relevant concepts may be selected for a user's search query using search results as discussed above and additional techniques may be employed to select one of the concepts for generating a search results page. For example, attribute information from the concepts may be employed for further disambiguation purposes. In particular, the search query received from an end user may be analyzed to determine if the search query contains an attribute in addition to a concept. As used herein, an "attribute" refers to an aspect, feature, or characteristic of a concept. For instance, attributes for a person may be characteristics such as birthday, age, height, weight, etc. If a search query is received that contains an attribute in addition to a concept, the attribute may be used by the search engine for disambiguation purposes. In particular, if only a single concept contains that attribute, that concept may be selected. As an example to illustrate, suppose a user submits a search query "director of titanic." The search engine may identify two concepts as being relevant to the search query—the boat (the RMS Titanic), and the movie ("Titanic"). Additionally, the search engine may identify "director" in the search query as an attribute and may determine that the movie "Titanic" is the only concept that has director as an aspect. As such, the search engine may select the movie "Titanic" as the concept for the search query.

Figure 4:
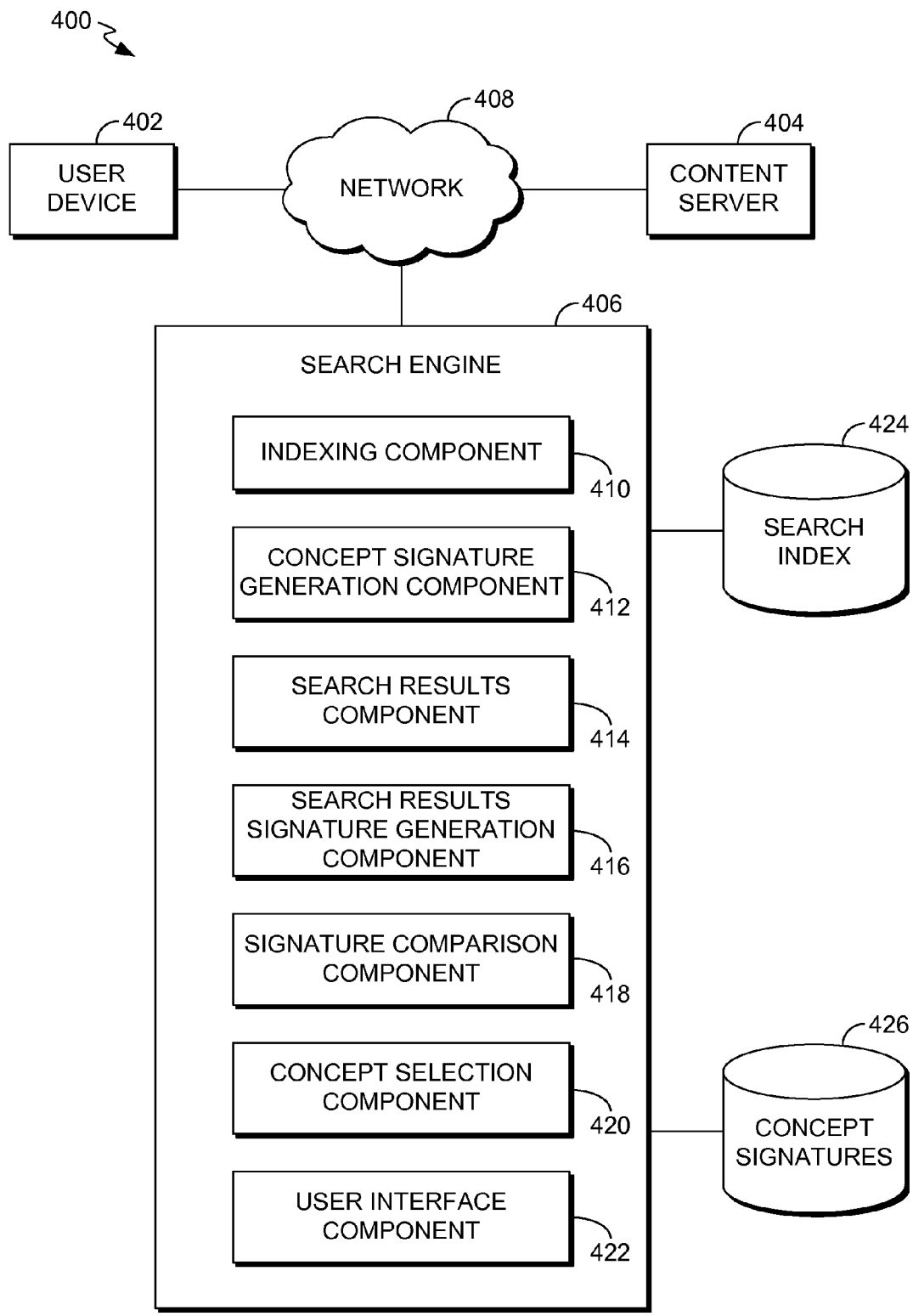
FIG. 4 is a block diagram of an exemplary system in which embodiments of the present invention may be employed.

Referring next to FIG. 4, a block diagram is provided illustrating an exemplary system 400 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 400 may include a user device 402, content server 404, and search engine server 406. Each of the components shown in FIG. 4 may be any type of computing device, such as computing device 100 described with reference to FIG. 1, for example. The components may communicate with each other via a network 408, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 400 within the scope of the present invention. Each may comprise a single device or multiple devices cooperating in a distributed environment. For instance, the search engine server 406 may comprise multiple devices arranged in a distributed environment that collectively provide the functionality of the search engine server 406 described herein. Additionally, other components not shown may also be included within the system 400.

In the embodiment shown in FIG. 4, the search engine server 406 includes, among other things, an indexing component 410, a concept signature generation component 412, a search results component 414, a search results signature generation component 416, a signature comparison component 418, a concept section component 420, and a user interface component 422.

The search engine server 406 generally operates to receive search queries from user devices, such as the user device 402, and to provide search results in response to the search queries. The user interface component 424 provides an interface to user devices, such as the user device 402, that allows users to submit search queries to the search engine server 406 and to receive search results from the search engine server 406. The user device 402 may be any type of computing device employed by a user to submit search queries and receive search results. By way of example only and not limitation, the user device 402 may be a desktop computer, a laptop computer, a tablet computer, a mobile device, or other type of computing device. The user device 402 may include an application that allows a user to enter a search query and submit the search query to the search engine server 406 to retrieve search results. For instance, the user device 402 may include a web browser that includes a search input box or allows a user to access a search page to submit a search query. Other mechanisms for submitting search queries to search engines are contemplated to be within the scope of embodiments of the present invention.

In embodiments of the present invention, the search engine server 406 may employ concept disambiguation to determine concepts associated with search queries submitted to the search engine server 406. Such information may be employed for a variety of purposes when providing search results to an end user in response to a search query. For instance, a concept identified from a search query may be employed to provide an "instant answer" on the search engine results page in addition to web page search results. As previously indicated, an "instant answer" is not a web document search results but instead may be succinct information that is presented on the search engine results page relevant to the concept identified in the search query. By way of example only and not limitation, an instant answer may be a profile view that provides a summary or overview of important information regarding the concept, or an instant answer may be an answer to a specific question submitted as a search query.

The indexing component 410 operates to index data regarding documents maintained by content servers, such as the content server 404. For instance, a crawling component (not shown) may be employed to crawl content servers and access information regarding documents maintained by the content servers. The indexing component 410 then indexes data regarding the crawled documents in the search index 424, which is employed to retrieve search results in response to search queries. Because documents identified as being representative of various concepts in an ontology are web documents available via content servers, such as the concept server 404, the indexing component 410 may crawl and index information regarding those documents, and the documents may be identified as search results to search queries.

The concept signature generation component 412 operates to generate concept signatures for an ontology of concepts and index the concept signatures for the concepts in a concept signatures storage 426. As discussed previously, embodiments of the present invention include identifying an ontology of concepts and identifying at least one document for each concept that is representative of that concept. The concept signature generation component 412 generates a concept signature for each concept in the ontology as a function of the one or more documents associated with each concept. In some embodiments, the concept signature for a concept may include the document identifier for each document associated with the concept. In some embodiments, the concept signature for a concept may be generated as a function of the content of each document associated with the concept. By way of example only and not limitation, a concept signature for a concept may be generated as a feature vector of terms and/or phrases found in the textual content of the document(s) associated with the concept.

In some embodiments, the ontology of concepts and/or the associated documents may be manually identified. In other embodiments, the concepts and/or associated documents may be automatically derived using an existing collection of documents. For instance, a content server, such as the content server 404, may store a collection of documents for an electronic encyclopedia. The search engine server 406 may access the collection of documents and employ the title of documents to derive the concepts of the ontology. Additionally, each document from the existing collection of documents may be used to generate the concept signature for the concept corresponding with that document. In further embodiments, an ontology may already be in place, and the documents from the existing collection of document may be mapped to various concepts in the ontology. Those documents would then be used to generate concept signatures for the corresponding concepts.

The search engine server 406 also includes a search results component 414 that identifies search results from the search index 424 in response to search queries. A search results signature generation component 416 analyzes search results for a search query and generates a search results signature as a function of the search results. Similar functions used by the concept signature generation component 412 to generate the concept signatures may be employed by the search results signature generation component 416 to generate search results signatures. For instance, in some embodiments, the search results signature may comprise document identifiers of documents in the search results. In some embodiments, the search results signature may be generated as a function of content of documents identified in the search results.

The search results signature generation component 416 may employ any portion of the search results generated for a search query when generating the search results signature. For instance, the search results signature generation component 416 may employ only the top N search results. Additionally, the search results signature generation component 416 may employ weighting of search results when generating the search results signature. This may include applying a greater weight to some search results based on various factors. By way of example only and not limitation, search results having higher rankings in the search results set may be given greater weight. Other factors, such as the number of user clicks a search result has received in the past for similar search queries, may be employed for weighting.

The signature comparison component 418 operates to compare a search results signature against concept signatures in the concept signatures storage 426. This comparison may include, for instance, comparing document identifiers in concept signatures with document identifiers in the search results signature. Because the documents associated with concepts are documents on the web and may be indexed in the search index 424, documents associated with concepts may be identified and returned as search results, thereby allowing identification of document in search results matching documents corresponding with concepts. Additionally or alternatively, the comparison performed by the signature comparison component 418 may include computing a similarity measure between the search results signature and concept signatures to determine the concept signatures having the greatest similarity to the search results signature. The concept selection component 420 may then rank and select one or more candidate concepts based on the comparison.

The process of obtaining search results, generating a search results signature, comparing the search results signature to concept signatures, and selecting one or more concepts may be performed by the search engine server 406 either offline or online. If performed offline, a number of expressions (each including one or more search terms) may be selected for processing and submitted as search queries. The expressions may be manually or algorithmically selected for offline processing to identify concepts to which the expressions refer. One or more concepts identified for each expression may then be stored in association with each expression. Accordingly, when a search query is submitted to the search engine server 406 by a user (e.g., a user submitting a search query via user device 402), the search query may be compared against stored expressions. If a match is found, one or more concepts stored with that expression may be selected and employed when returning a search results page to the user (e.g., to provide an instant answer on the search results page).

Alternatively, the processing and identification of relevant concept(s) for a search query may be performed online when the search query is received. In particular, when a user (e.g., a user employing the user device 402) submits a search query to the search engine server 406, the search engine server 406 processes the query to identify search results, generate a search results signature, compare the search results signature to concept signatures, and identify one or more relevant concepts that may be employed when returning a search results page to the user (e.g., to provide an instant answer on the search results page).

Figure 5:
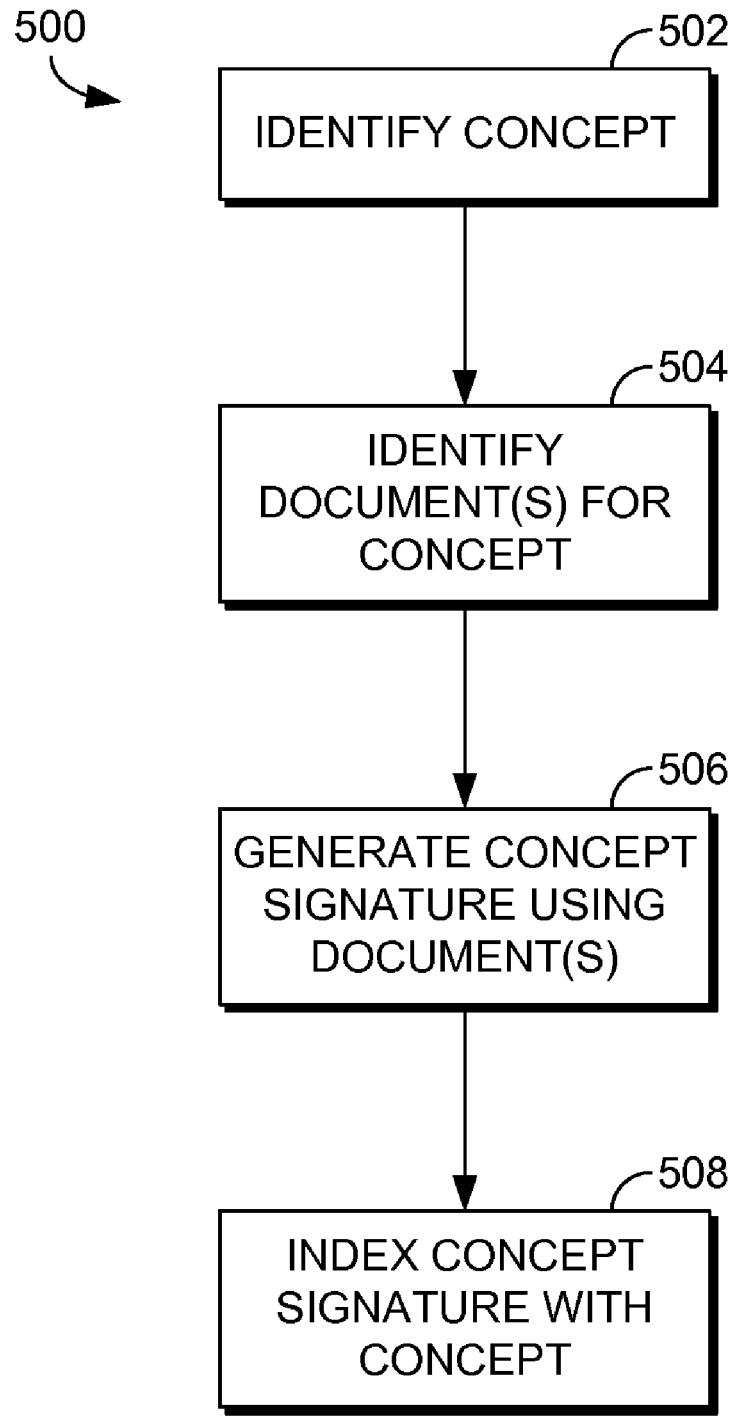
FIG. 5 is a flow diagram showing a method for generating and storing a concept signature for a concept in accordance with an embodiment of the present invention.

Turning to FIG. 5, a flow diagram is provided that illustrates a method 500 for generating and storing a concept signature for a concept from an ontology in accordance with an embodiment of the present invention. As can be understood, the method 500 may be performed to generate and store a concept signature for each concept in the ontology.

Initially, as shown at block 502, a concept is identified. As discussed previously, an ontology containing a number of different concepts may be employed by embodiments of the present invention. In some embodiments, the ontology and various concepts may be manually identified. In other embodiments, the ontology and various concepts may be automatically generated from an existing collection of documents, for instance, by identifying the titles of the documents as concepts.

At least one document is identified for the concept, as shown at block 504. The document contains content that is unique to and representative of the concept. For instance, the concept may be Michael Jordan, and the document may be a biography of Michael Jordan. A document may be either manually or automatically identified for a concept. As an example of the latter, documents from an existing document corpus may be automatically mapped to concepts in the ontology.

In some embodiments, concepts may have a one-to-one relationship with documents such that a single concept may have only a single document corresponding with it. In other embodiments, concepts may have a one-to-many relationship with documents such that a single concept may have multiple documents corresponding with it. As such, the process at block 504 may include identifying multiple documents with a single concept. For instance, in some embodiments, multiple existing document corpuses may be employed to map documents to concepts. In such embodiments, documents from the various corpuses may all be directed to a single concept, and each of the documents may be associated with that concept.

A concept signature is generated for the concept at block 506 as a function of the document(s) identified at block 504. In some embodiments, the concept signature may include the document identifier for each document identified for the concept. In some embodiments, the concept signature may be generated as a function of the content of the document(s). Any of a variety of different functions may be employed to generate such a concept signature. By way of example only and not limitation, the concept signature may be generated as a feature vector based on terms and/or phrases found in the textual content of the document(s).

As noted above, a single document or multiple documents may be identified for the concept at block 504. If multiple documents are identified, either a single concept signature or multiple concept signatures may be generated for the concept at block 506. For instance, a single concept signature may be generated as a function of the content from all identified documents. Alternatively, a concept signature may be generated for each of the identified documents, such that multiple concepts signatures are generated for the concept. The concept signature(s) generated at block 506 are indexed with the concept, as shown at block 508. As such, the concept signature(s) may be employed in conjunction with search results for disambiguation purposes.

Figure 6:
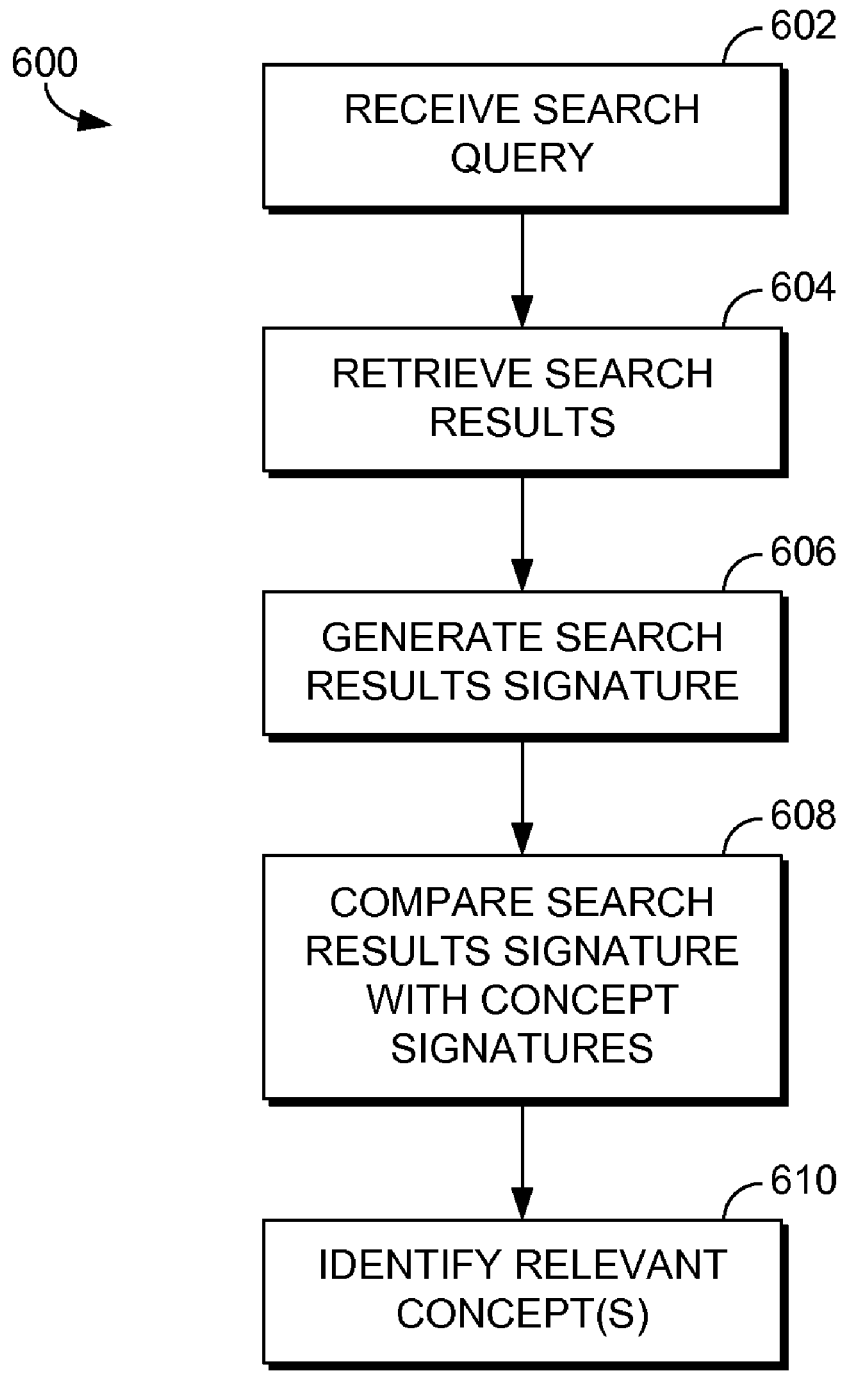
FIG. 6 is a flow diagram showing a method for identifying a concept for a search query in accordance with an embodiment of the present invention.

With reference now to FIG. 6, a flow diagram is provided that illustrates a method 600 for identifying a concept for a search query in accordance with an embodiment of the present invention. As shown at block 602, a search query is received. A search is performed using the search query to identify a set of search results, as shown 604.

A search results signature is generated from the search results, as shown at block 606. Any portion or all of the search results may be used to generate the search results signature. In some embodiments, the search results signature may include document identifiers for documents listed in the search results. In some embodiments, the search results signature may be generated as a function of the content of documents identified in the search results. By way of example only and not limitation, the search results signature may be a feature vector generated based on terms found in the textual content of documents identified by the search results.

The process of generating a search results signature at block 606 may include applying different weightings to search results. For instance, weighting may be applied based on rank of search results, with greater weight given to higher ranked search results. In some embodiments, various other factors may be employed for weighting purposes. For instance, some of the ranking features used by a search engine ranker to generate the search results for the search query may be used to determine weighting. As a specific example, search results that have historically received higher clicks from users may be given greater weight.

The search results signature generated at block 606 is compared against concept signatures, as shown at block 608. In some embodiments, the signatures may be based on document identifiers, and the comparison may include identifying concept signatures having document identifiers matching document identifiers from the search results signature. In other embodiments, the signatures may have been computed as a function of document content. In such embodiments, the comparison at block 608 may include determining a similarity measure between the search results signature and concept signatures. Any number of different measures of similarity may be employed within the scope of embodiments of the present invention. For instance, cosine similarity may be used to measure the similarity between the search results signature and concept signatures.

Based on the comparison of the search results signature with the concept signatures, the concept signatures may be ranked and one or more concept signatures may be selected for the search query, as shown at block 610. For instance, concept(s) having concept signatures with the greatest similarity to the search results signature may be identified as being relevant to the search query.

The method 600 described above with reference to FIG. 6 may be performed either offline or online. If offline, the search query received at block 602 is not an end user search query. Instead, the search query is algorithmically generated for processing by the search system or manually generated by search system personnel for offline process. When the search query is processed offline, one or more concepts identified for the search query are stored in association with the search query. As such, when a user submits a search query to the search engine (i.e., online processing), the user's search query may be compared against stored search queries to identify a matching stored search query. The concept(s) associated with that search query may then be employed to generate the search results page for returning to the end user.

If the method 600 is performed online, the search query received at block 602 is a search query submitted to the search system by an end user. The user's search query is processed via the method 600 to select one or more concepts for the search query, which are then used to generate the search results page to return to the end user.

Figure 7:
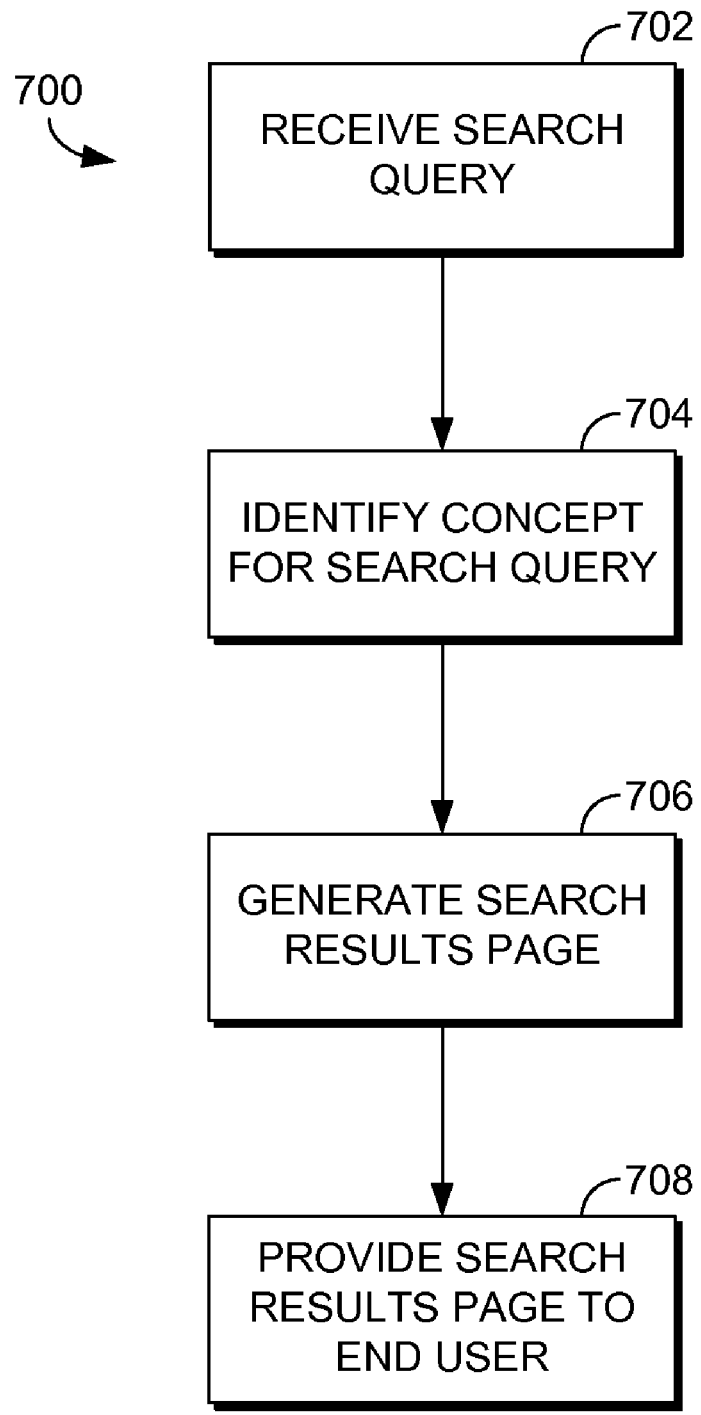
FIG. 7 is a flow diagram showing a method for processing a user search query to identify a concept and generate a search results page in accordance with an embodiment of the present invention.

FIG. 7 is a flow diagram that generally illustrates an online processing method 700 in accordance with an embodiment of the present invention. Initially, a search query submitted by an end user is received, as shown at block 702. The search query is processed at block 704 to identify a concept to which the search query pertains. In embodiments in which search queries have been processed offline (or previously performed online and the results cached), this may include accessing a storage of search query/concept pairs to identify a stored matching query and its associated concept. In embodiments in which search queries have not been processed offline or if a matching stored search query cannot be located, the search query may be processed using, for instance, the method 600 to identify the relevant concept. In still further embodiments, additional techniques may be employed to disambiguate the concept for the search query. For instance, an attribute may be identified as part of the search query, and used to select from multiple candidates concepts identified for the search query. In particular, if only one of the candidate concepts include that identified attribute, that concept may be selected for the search query.

The identified concept is used to generate a search results page, as shown at block 706. For instance, the concept may be employed to select an instant answer that is provided on the search results page in addition to web document search results identified from the search index. The search results page is provided for presentation to the end user at block 708.

In some embodiments, a disambiguation page may be provided to an end user in response to a search query to allow the end user to manually select for one of several concepts identified for a search query. In particular, when the search query is received at block 702, several concepts may be identified at block 704. The search results page generated at block 706 may include a disambiguation list that lists the several concepts identified for the search query. When the disambiguation page is provided to the end user at block 708, the end user may select a concept, and the selected concept may be identified to the search engine, which may employ the selected concept to generate a new search results page that is provided to the end user.

As can be understood, embodiments of the present invention provide for concept disambiguation for search queries using search results. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform a method comprising:
    identifying a concept and a document associated with the concept;
    generating a concept signature for the concept based on the document associated with the concept, the concept signature comprising a document identifier for the document associated with the concept;
    receiving a search query submitted by an end user;
    identifying search results for the search query;
    generating a search results signature based on the search results, the search results signature comprising document identifiers of documents corresponding with the search results;
    comparing the search results signature to the concept signature by determining if the document identifiers of documents corresponding with the search results include the document identifier for the document associated with the concept;

identifying the concept as being relevant to the search query based on comparison of the search results signature to the concept signature, wherein the identifying the concept as being relevant to the search query comprises identifying a plurality of concepts as being relevant to the search query and selecting the concept from the plurality of concepts by determining that the concept signature for the concept has the greatest similarity to the search results signature;

generating a search results page based on the concept, wherein the generating the search results page based on the concept comprises generating an instant answer using the concept and including the instant answer on the search results page in addition to the search results; and providing the search results page for presentation to the end user.

2. The one or more computer storage media of claim 1, wherein the concept is identified as part of an ontology of concepts.

3. The one or more computer storage media of claim 2, wherein the ontology of concepts is manually generated.

4. The one or more computer storage media of claim 2, wherein the ontology of concepts is automatically derived from an existing collection of documents, and wherein the document is from the existing collection of documents.

5. The one or more computer storage media of claim 1, wherein at least one additional document is identified as corresponding with the concept.

6. A computer-implemented method for providing a search results page in response to a search query, the method comprising:

analyzing a corpus of documents to identify a plurality of concepts, each concept of the concepts corresponding with a document within the corpus of documents;

generating a concept signature for said each concept of the concepts based on the document from the corpus of documents corresponding with said each concept, the concept signature for said each concept comprising a document identifier for the document associated with said each concept;

storing the concept signature with said each concept;

receiving the search query from an end user;

performing a search to identify search results for the search query;

generating a search results signature based on the search results, the search results signature comprising document identifiers of documents corresponding with the search results;

comparing the search results signature with the concept signatures by determining an extent to which each concept signature includes document identifiers matching document identifiers in the search results signature;

identifying a first concept as being relevant to the search query based on comparison of the search results signature with the concept signatures, wherein identifying the first concept as being relevant to the search query comprises identifying a plurality of concepts as being relevant to the search query and selecting the first concept from the plurality of concepts by determining that the first concept has a first concept signature with the greatest similarity to the search results signature;

generating a search results page based on the first concept, wherein generating the search results page based on the first concept comprises generating an instant answer using the first concept and including the instant answer on the search results page in addition to the search results; and providing the search results page for presentation to the end user in response to the search query.

7. The method of claim 6, wherein at least one additional document is identified as corresponding with at least one concept.

8. A system including at least one processor and at least one computer storage medium storing a plurality of components comprising:

a concept signature component that generates concept signatures for a plurality of concepts, a concept signature for each concept of the concepts being generated based on a document identified as being representative of each concept, the concept signature for each concept comprising a document identifier for a document associated with each concept;

a search results component that performs a search on a search index using a search query submitted by an end user to retrieve a set of search results;

a search results signature generation component that generates a search results signature based on the set of search results, the search results signature comprising document identifiers of documents corresponding with the search results;

a signature comparison component that compares the search results signature against the concept signatures by determining an extent to which each concept signature includes document identifiers matching document identifiers in the search results signature;

a concept selection component that selects a first concept for the search query based on comparison of the search results signature against the concept signatures, wherein the concept selection component identifies a plurality of concepts as being relevant to the search query and selects the first concept from the plurality of concepts by determining that the first concept has a first concept signature with the greatest similarity to the search results signature; and a user interface component that provides a search results page generated based on the first concept for presentation to the end user, wherein the search results page is generated based on the first concept by generating an instant answer using the first concept and including the instant answer on the search results page in addition to the search results.

* * * * *